United States Patent
Gorbuntsov et al.

[15] 3,662,254
[45] May 9, 1972

[54] FERRORESONANCE VOLTAGE STABILIZER

[72] Inventors: Alexandr Fedorovich Gorbuntsov, Kremlevskaya, 4, kv. 3; Efim Petrovich Berlinblau, ulitsa Schastlivaya, 7, kv. 89; Nikolai Kuzmich Pul, Kremlevskaya, 63, kv. 20, all of Zaporozhie, U.S.S.R.

[22] Filed: Dec. 1, 1970

[21] Appl. No.: 93,954

[52] U.S. Cl. .................................323/45, 323/61
[51] Int. Cl. .........................................G05f 3/06
[58] Field of Search...................323/45, 48, 57, 61, 83

[56] References Cited

UNITED STATES PATENTS

| | | |
|---|---|---|
| 2,442,214 | 5/1948 | Short.........................................323/61 |
| 3,351,849 | 11/1967 | Mesenhimer..............................323/45 |
| 3,135,894 | 6/1964 | Oglesbee et al.......................323/45 X |
| 3,382,427 | 5/1968 | Quimby..................................323/48 X |

Primary Examiner—A. D. Pellinen
Attorney—Holman & Stern

[57] ABSTRACT

A ferroresonance voltage stabilizer for stabilizing a power supply voltage by minimizing voltage variations in an output circuit thereof, of the type having a saturable transformer winding in series with a linear choke, a compensating winding connected in series with an output circuit and a capacitor making a ferroresonant circuit with the transformer winding, in which an additional compensating winding is provided in series with the capacitor to compensate variations of voltage in the capacitor circuit, thereby to get a well regulated and stabilized output voltage.

2 Claims, 1 Drawing Figure

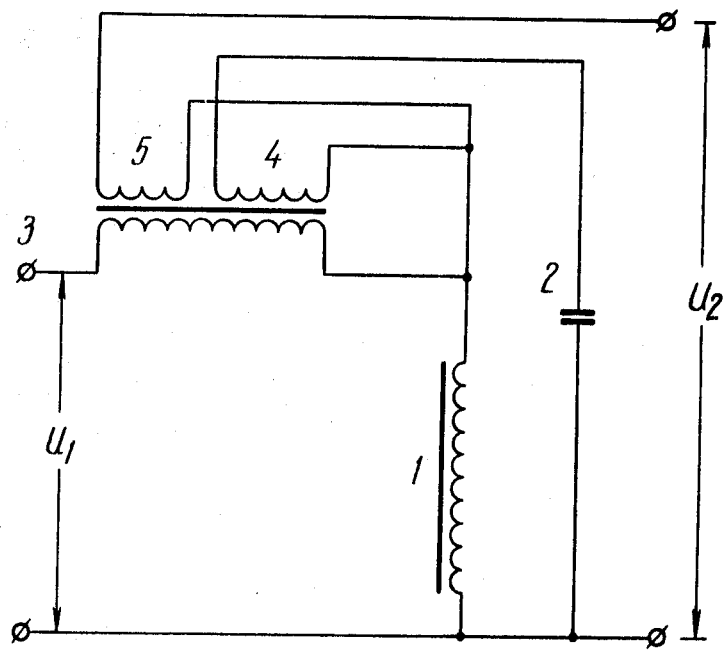

FERRORESONANCE VOLTAGE STABILIZER

The present invention relates to means for stabilizing a power supply voltage, and more specifically to ferroresonance voltage stabilizers.

Known in the art are ferroresonance voltage stabilizers comprising a transformer the input circuit of which contains a linear reactor connected in series with the transformer winding. The stabilizer also contains a capacitor making up together with the transformer winding a ferroresonant circuit. The linear reactor in such stabilizers has an inductively associated compensating winding connected in series with the output circuit of the transformer and intended to compensate for variations in the output voltage.

However, these voltage stabilizers have no provision for compensating variations in the voltage across the capacitor, and this impairs the accuracy of stabilization.

There also exist ferroresonance voltage stabilizers utilizing parallel (current) resonance, in which the compensating winding is connected in the common circuit of the capacitor and output.

A disadvantage of these stabilizers consists in that the compensating voltage is the same for the capacitor circuit and for the output circuit, while the voltages across these circuits experience different variations, because of which these variations cannot effectively be compensated.

The present invention aims at providing a ferroresonance voltage stabilizer in which variations in the voltage across a capacitor and across an output are compensated so that the variations in the output voltage are minimized, thereby improving the accuracy of stabilization.

With this and other objects in view, the invention resides in a ferroresonance voltage stabilizer comprising a transformer the input circuit of which contains a series-connected linear reactor having a compensating winding placed in the output circuit of the transformer, and a capacitor connected with the transformer winding so that they make up a ferroresonant circuit, in which the linear reactor has inductively associated with it, according to the invention, an additional compensating winding arranged in series with the capacitor.

The application of the invention disclosed herein will improve the accuracy of voltage stabilization or, with the same accuracy of stabilization, permit using capacitors of lower capacitance and saving in the active materials employed.

The invention will be more fully understood from the following description of a preferred embodiment when read in connection with the accompanying drawing showing the circuit schematic of a ferroresonance voltage stabilizer according to the invention.

The ferroresonance voltage stabilizer disclosed herein comprises a transformer operating on the principle of magnetic staturation, for example, a saturable autotransformer 1, and a capacitor 2 connected to the autotransformer 1 and making up together with the transformer winding a parallel (current) resonant circuit, thereby extending the limits of stabilization.

A linear reactor 3 series-connected in the input circuit of the autotransformer 1 carries two compensating windings 4 and 5 inductively associated therewith. The winding 4 is connected in series with the capacitor 2, and the winding 5 is connected in series with the output circuit of the autotransformer 1.

The stabilizer disclosed herein operates as follows.

With the stabilizer energized, the voltage across the saturable autotransformer 1 varies to a much lesser extent than the input voltage $\mu_1$. Provision of the capacitor 2, making up together with the autotransformer 1 a parallel (current) resonant circuit extends the limits of stabilization in the direction of low input voltages. At the same time, the difference in between the input voltage and that across the autotransformer 1 is absorbed by the linear reactance 3 which thus acts similar to a ballast resistance.

The voltage taken by the compensating winding 4 inductively associated with the linear reactor 3 minimizes variations in the voltage across the capacitor 2, and this additionally extends the limits of stabilization.

The voltage taken by the compensating winding 5, also inductively associated with the linear reactor 3, minimizes the residual voltage variations across the output $\mu_2$.

The compensating windings 4 and 5 differ in the number of turns, which are selected for each winding separately so that variations in the output voltage are brought to a minimum.

What is claimed is:

1. A ferro-resonance voltage stabilizer for obtaining a stabilized voltage output from a varying voltage power source comprising: a linear reactor winding in series with a transformer winding, the two together to be connected across the varying voltage power source; a first compensating winding which is inductively associated with said linear reactor winding but connected in series with said transformer winding, the two in series providing a voltage stabilized output circuit of the voltage stabilizer; a capacitor connected across said transformer winding and forming with it a ferroresonant circuit; and a second compensating winding also inductively associated with the linear reactor winding but connected in series with said capacitor to compensate voltage-variations across the capacitor thereby improving the voltage stabilization in said output circuit.

2. A ferro-resonance voltage stabilizer as claimed in claim 1 in which said transformer winding is a saturable autotransformer winding.

* * * * *